United States Patent
R et al.

(10) Patent No.: US 11,609,702 B2
(45) Date of Patent: Mar. 21, 2023

(54) INTELLIGENT STORAGE ALLOCATION BASED ON WORKSPACE CONTEXT IN A ZFS ENVIRONMENT

(71) Applicant: Dell Products L.P., Round Rock, TX (US)

(72) Inventors: Srinivasa Ragavan R, Bangalore (IN); Jyothi Bandakka, Bengaluru (IN); Ankur Agarwal, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/406,403

(22) Filed: Aug. 19, 2021

(65) Prior Publication Data

US 2023/0053904 A1 Feb. 23, 2023

(51) Int. Cl.
*G06F 3/06* (2006.01)

(52) U.S. Cl.
CPC .......... *G06F 3/0631* (2013.01); *G06F 3/0604* (2013.01); *G06F 3/0676* (2013.01); *G06F 3/0677* (2013.01); *G06F 3/0679* (2013.01)

(58) Field of Classification Search
CPC .... G06F 3/0631; G06F 3/0604; G06F 3/0676; G06F 3/0677; G06F 3/0679
See application file for complete search history.

(56) References Cited

U.S. PATENT DOCUMENTS

| | | | | |
|---|---|---|---|---|
| 7,028,158 B1* | 4/2006 | Beatty | ............... | G06F 11/3442 |
| | | | | 711/202 |
| 11,283,685 B1* | 3/2022 | Mestman | ............... | H04L 67/01 |
| 11,366,702 B1* | 6/2022 | Philbrick | ............... | G06F 9/5016 |
| 2005/0210467 A1* | 9/2005 | Zimmer | ............... | G06F 9/45558 |
| | | | | 718/1 |
| 2012/0096217 A1* | 4/2012 | Son | ............... | G06F 12/0246 |
| | | | | 711/E12.008 |
| 2012/0173581 A1* | 7/2012 | Hartig | ............... | G06F 11/0745 |
| | | | | 707/E17.001 |
| 2019/0102206 A1* | 4/2019 | Fichtenholtz | ............... | G06F 9/5005 |

OTHER PUBLICATIONS

Oracle White Paper, "Architectural Overview of the Oracle ZFS Storage Appliance", Aug. 2019 (Year: 2019).*
C. Pugh, P. Henderson, K. Silber, T. Carroll and K. Ying, "Utilizing zfs for the storage of acquired data," 2009 23rd IEEE/NPSS Symposium on Fusion Engineering, San Diego, CA, USA, 2009, pp. 1-4, doi: 10.1109/FUSION.2009.5226462. (Year: 2009).*

* cited by examiner

*Primary Examiner* — Khoa D Doan
(74) *Attorney, Agent, or Firm* — Kirton McConkie; Brian Tucker

(57) ABSTRACT

Storage can be allocated to workspaces in a ZFS-based environment. Workspaces can be associated with a workspace weightage. When a workspace is deployed on a client computing device, its workspace weightage can be used to determine an initial quota for a dataset to be created in a zpool for the workspace. The initial quota can be used to determine the size of the dataset. The workspace weightage may also be used to determine an expansion quota and a contraction quota that can be used to calculate the size of an expansion or contraction respectively. The use of workspace weightages and their associated quotas can ensure that the zpool is fairly shared by the various datasets that may be created therein for workspaces deployed on the client computing device.

20 Claims, 10 Drawing Sheets

| Workspace Characterization Table 401 ||||
|---|---|---|---|
| Workspace Type | Privilege Level | Trusted | Workspace Weightage |
| Designer Apps | User / Admin | Y | Heavy |
| Designer Apps | User / Admin | N | Non-Trusted |
| Productivity Apps | User / Admin | Y | Medium |
| Productivity Apps | User / Admin | N | Non-Trusted |
| Text Editing Apps | User / Admin | Y | Light |
| Text Editing Apps | User / Admin | N | Non-Trusted |
| Personal Workspace | User | Y | Light |
| Shared Storage | Admin | Y | Heavy |
| Shared Storage | User | Y | Medium |
| ⋮ | | | |

| Dataset Quota Table 402 ||||
|---|---|---|---|
| Workspace Weightage | Initial Quota | Expansion Quota | Contraction Quota |
| Heavy | 100% | 50% | 50% |
| Medium | 50% | 25% | 25% |
| Light | 25% | 12.5% | 12.5% |
| Non-Trusted | 25% | 5% | 5% |

Workspace Characterization Table 401

| Workspace Type | Privilege Level | Trusted | Workspace Weightage |
|---|---|---|---|
| Designer Apps | User / Admin | Y | Heavy |
| Designer Apps | User / Admin | N | Non-Trusted |
| Productivity Apps | User / Admin | Y | Medium |
| Productivity Apps | User / Admin | N | Non-Trusted |
| Text Editing Apps | User / Admin | Y | Light |
| Text Editing Apps | User / Admin | N | Non-Trusted |
| Personal Workspace | User | Y | Light |
| Shared Storage | Admin | Y | Heavy |
| Shared Storage | User | Y | Medium |
| ... | | | |

Dataset Quota Table 402

| Workspace Weightage | Initial Quota | Expansion Quota | Contraction Quota |
|---|---|---|---|
| Heavy | 100% | 50% | 50% |
| Medium | 50% | 25% | 25% |
| Light | 25% | 12.5% | 12.5% |
| Non-Trusted | 25% | 5% | 5% |

*FIG. 4*

INTELLIGENT STORAGE ALLOCATION BASED ON WORKSPACE CONTEXT IN A ZFS ENVIRONMENT

CROSS-REFERENCE TO RELATED APPLICATIONS

N/A

BACKGROUND

Containerization in the software context refers to a technique for packaging an application and its dependencies into a container to abstract/isolate the application from the underlying host operating system and environment. A number of containerization techniques exist. FIG. 1 represents a computing device 100 that has physical hardware 101, a hypervisor 102 and a host operating system 120. Application 121 is an example of an application that is not containerized (i.e., a native application) in that it relies on binaries/libraries 120 to interface directly with host operating system 110. In contrast, application 122 represents an application that is executed in a first type of container in which containerization is implemented using access control mechanisms 123. Examples of solutions that implement containerization through access control mechanisms 123 include Security-Enhanced Linux (SELinux) and AppArmor.

Application 124 is an example of an application that is executed in a second type of container in which containerization is implemented using software virtualization. Examples of solutions that implement containerization through software virtualization (or "software containers") include Docker and FreeBSD Jails. As represented in FIG. 1, application 124 and its binaries/libraries 131 may be isolated within its own container 132 that is executed via a container engine 130 that runs on host operating system 110. Variations of this second type of container include Intel Software Guard Extensions (SGX) and Arm TrustZone which containerize an application within a secure region of memory.

Application 125 is an example of an application that is executed in a third type of container in which containerization is implemented using hardware virtualization. Examples of solutions that implement containerization through hardware virtualization (or "hardware containers") include Kata Containers, Hyper-V Docker and Qubes OS. As represented in FIG. 1, with hardware containers, a uni/mini kernel 140 may be executed on hypervisor 102. A container engine 141 can then be run on uni/mini kernel 140 to containerize application 125 and its binaries/libraries 142.

Although not represented in FIG. 1, it is even possible to combine multiple types of containerization solutions. For example, Docker may be used with SELinux to execute an application. As another example, Graphene combines software enclaves (e.g., Intel SGX) with hardware virtualization. Accordingly, there is a wide variety of container modes for executing an application.

It is becoming more common for an enterprise to use containerization solutions to run applications on computing devices that its employees may use. A primary benefit of employing containerization solutions is that it enables the applications to be deployed and launched from a cloud-based management server or other centralized repository as opposed to being installed on the computing devices as native applications. As a result, the employees can launch the applications on a variety of computing devices such as a work computer, a home computer, a smart phone, etc.

Containerization also facilitates the use of workspaces. The term "workspace" will be used to reference a grouping of applications and/or user data. In some cases, a workspace may be implemented using an encrypted home folder that contains user data and applications installed for a particular user or the system. In other cases, a workspace may be implemented using one or more containers that may be associated with a theme. For example, a workspace may oftentimes include a single container within which all applications in the group are containerized, associated with a cloud or a local storage and to which the theme is applied. However, a workspace could also include multiple containers in which the applications in the group are containerized if the same theme is applied to each of the multiple containers. Examples of workspaces include a performance workspace (e.g., a container that is configured to optimize the performance of the applications running in the container), a security workspace (e.g., a container that is configured to optimize the security of the applications running in the container), a hardware-enabled workspace (e.g., a container that is configured to enable the applications running in the container to access peripherals or other hardware), a corporate workspace (e.g., a container customized for a workplace environment), a home workspace (e.g., a container customized for a home environment), a public workspace (e.g., a container customized for a public environment), etc.

FIG. 2, which should not be considered prior art, provides an example of how workspaces may be implemented on computing device 100. In this example, there is a software-based container 210 in which applications 211-213 are containerized along with their respective binaries and libraries 214. A particular theme could be applied to container 210 such that container 210 may constitute a workplace 201. In other words, each of applications 211-213 may be assigned to workspace 201 by virtue of their being containerized in container 210. Similarly, in this example, there is a hardware-based container 220 in which applications 221-223 are containerized along with their respective binaries and libraries 224. A particular theme could be applied to container 220 such that container 220 may constitute a workplace 202. In other words, each of applications 221-223 may be assigned to workspace 202 by virtue of their being containerized in container 220.

At any given time, one or more workspaces may be implemented on a computing device. For example, in some cases, all applications deployed on a computing device may be assigned to the same workspace at a particular time. In other cases, a first set of one or more applications deployed on a computing device may be assigned to a first workspace and a second set of one or more applications deployed on the computing device may be assigned to a second workspace at a particular time. Accordingly, a wide variety of workspace configurations and scenarios may be used.

When workspaces are deployed on a computing device to host applications, storage may be allocated and associated with the workspaces. For example, the computing device may be configured to implement a ZFS file system and therefore may employ a ZFS pool, or zpool, from which datasets can be allocated to the workspaces. A zpool consists of a number of virtual devices (vdevs) that consist of a number of physical devices (e.g., one or more hard drives or solid-state storage devices). These datasets may typically be allocated as part of the initial deployment of the workspaces and may typically have a fixed size.

BRIEF SUMMARY

The present invention extends to systems, methods and computer program products for allocating storage to workspaces in a ZFS-based environment. Workspaces can be associated with a workspace weightage. When a workspace is deployed on a client computing device, its workspace weightage can be used to determine an initial quota for a dataset to be created in a zpool for the workspace. The initial quota can be used to determine the size of the dataset. The workspace weightage may also be used to determine an expansion quota and a contraction quota that can be used to calculate the size of an expansion or contraction respectively. The use of workspace weightages and their associated quotas can ensure that the zpool is fairly shared by the various datasets that may be created therein for workspaces deployed on the client computing device.

In some embodiments, the present invention may be implemented as a method for allocating storage to workspaces in a ZFS-based environment. A workspace weightage assigned to a workspace can be determined. Based on the workspace weightage, an initial quota for a dataset for the workspace can be selected. The dataset can then be created in a zpool with a size matching the initial quota.

In some embodiments, the present invention may be implemented as computer storage media storing computer executable instructions which when executed implement a method for allocating storage to workspaces in a ZFS-based environment. It can be determined that a first workspace on a client computing device has a first workspace weightage. A first dataset can then be created in a zpool with a first size matching a first initial quota defined for the first workspace weightage. It can also be determined that a second workspace on the client computing device has a second workspace weightage. A second dataset can then be created in the zpool with a second size matching a second initial quota defined for the second workspace weightage.

In some embodiments, the present invention may be implemented as a client computing device that includes one or more processors and computer storage media storing computer executable instructions which when executed by the one or more processors implement a method for allocating storage to workspaces in a ZFS-based environment. It can be determined that a workspace on the client computing device has a workspace weightage. A dataset can then be created in a zpool with a size matching an initial quota defined for the workspace weightage. In response to determining that consumption of the dataset has exceeded a first threshold, the dataset can be expanded with an expansion size matching an expansion quota defined for the workspace weightage. In response to determining that consumption of the dataset has fallen below a second threshold, the dataset can be contracted by a contraction size matching a contraction quota defined for the workspace weightage.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 4 provides examples of data structures that could be used to implement embodiments of the present invention.

DETAILED DESCRIPTION

Figure 1:
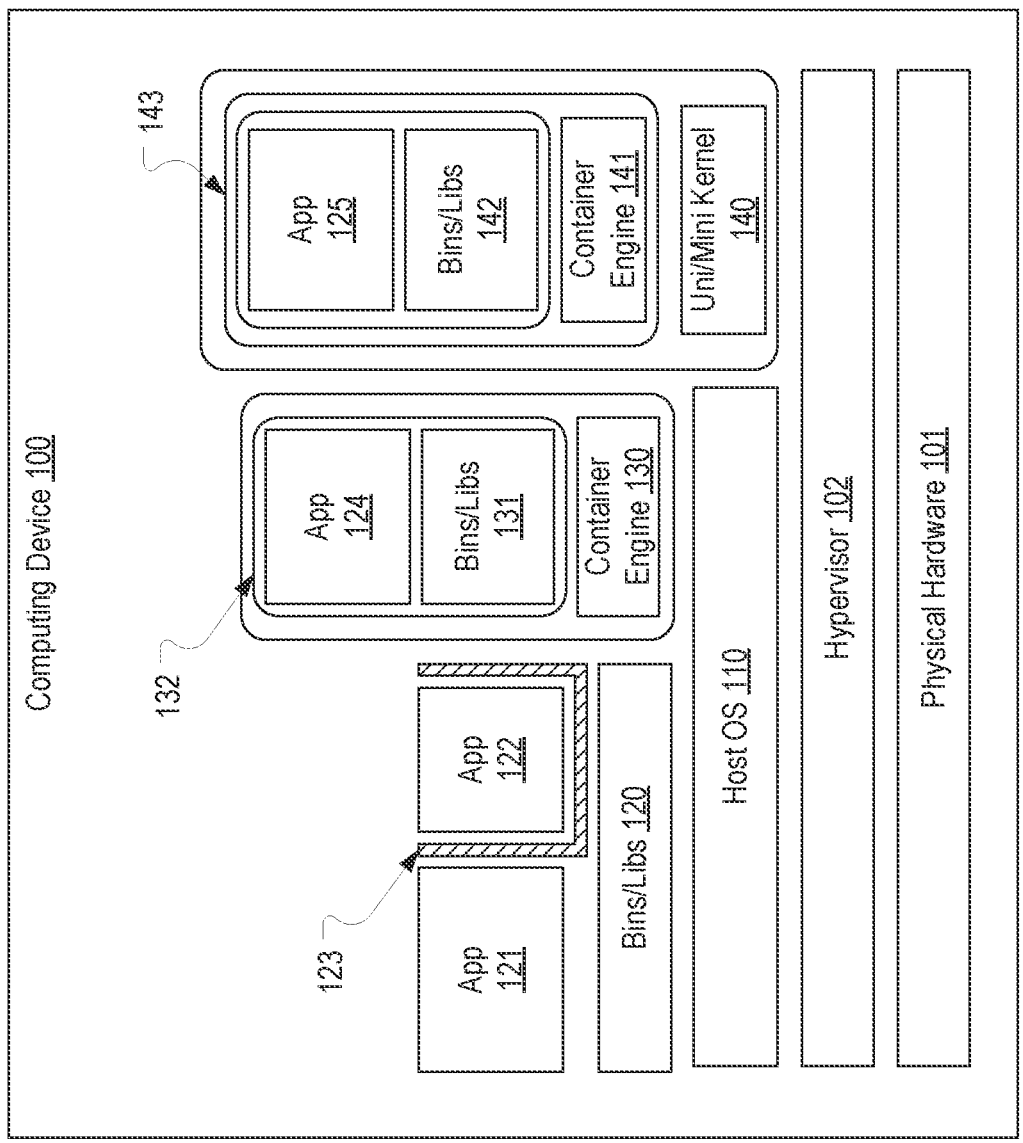
FIG. 1 provides examples of various types of containers that can be used to execute an application on a computing device.
Figure 2:
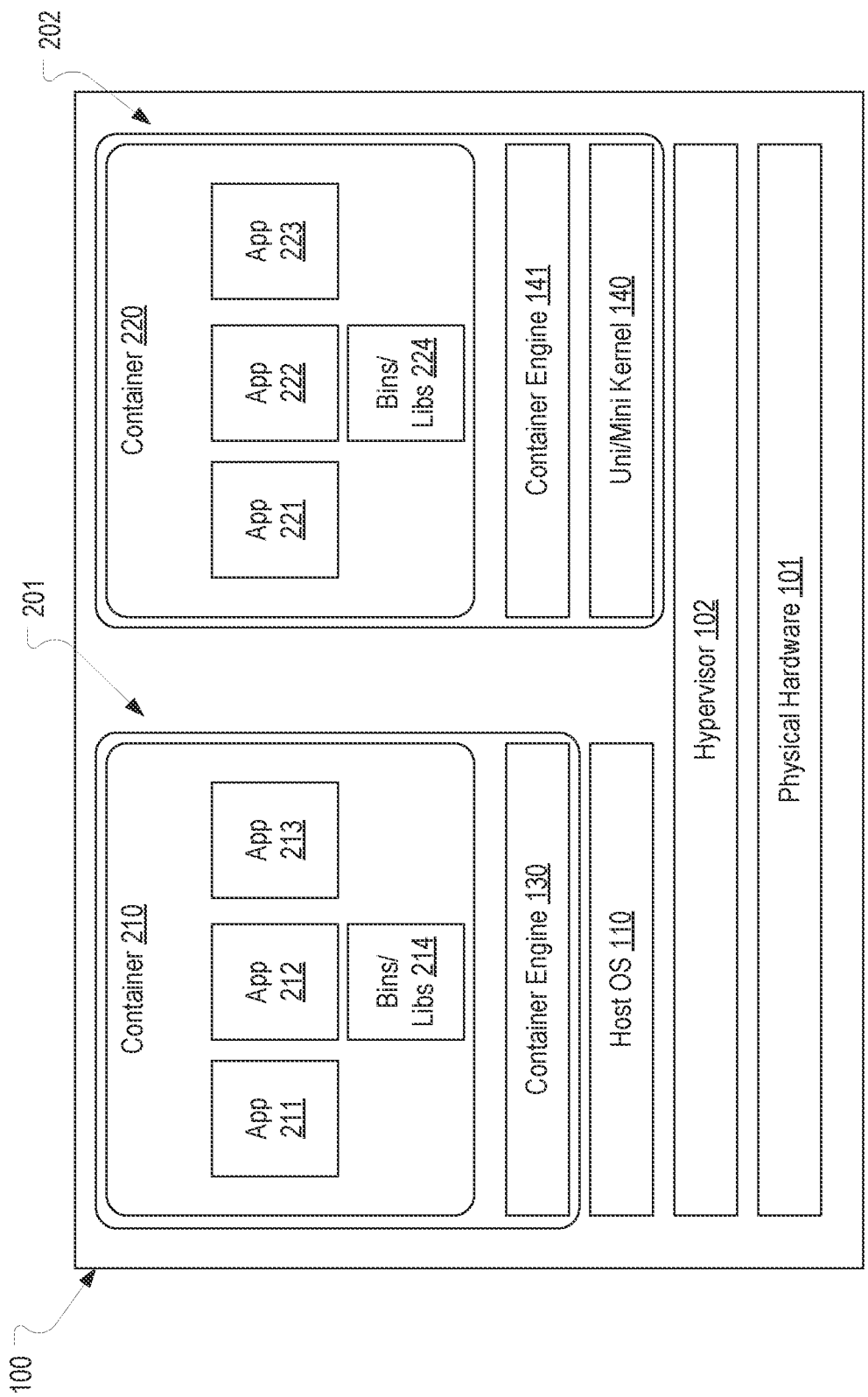
FIG. 2 provides an example of how containers may be used to implement workspaces.
Figure 3:
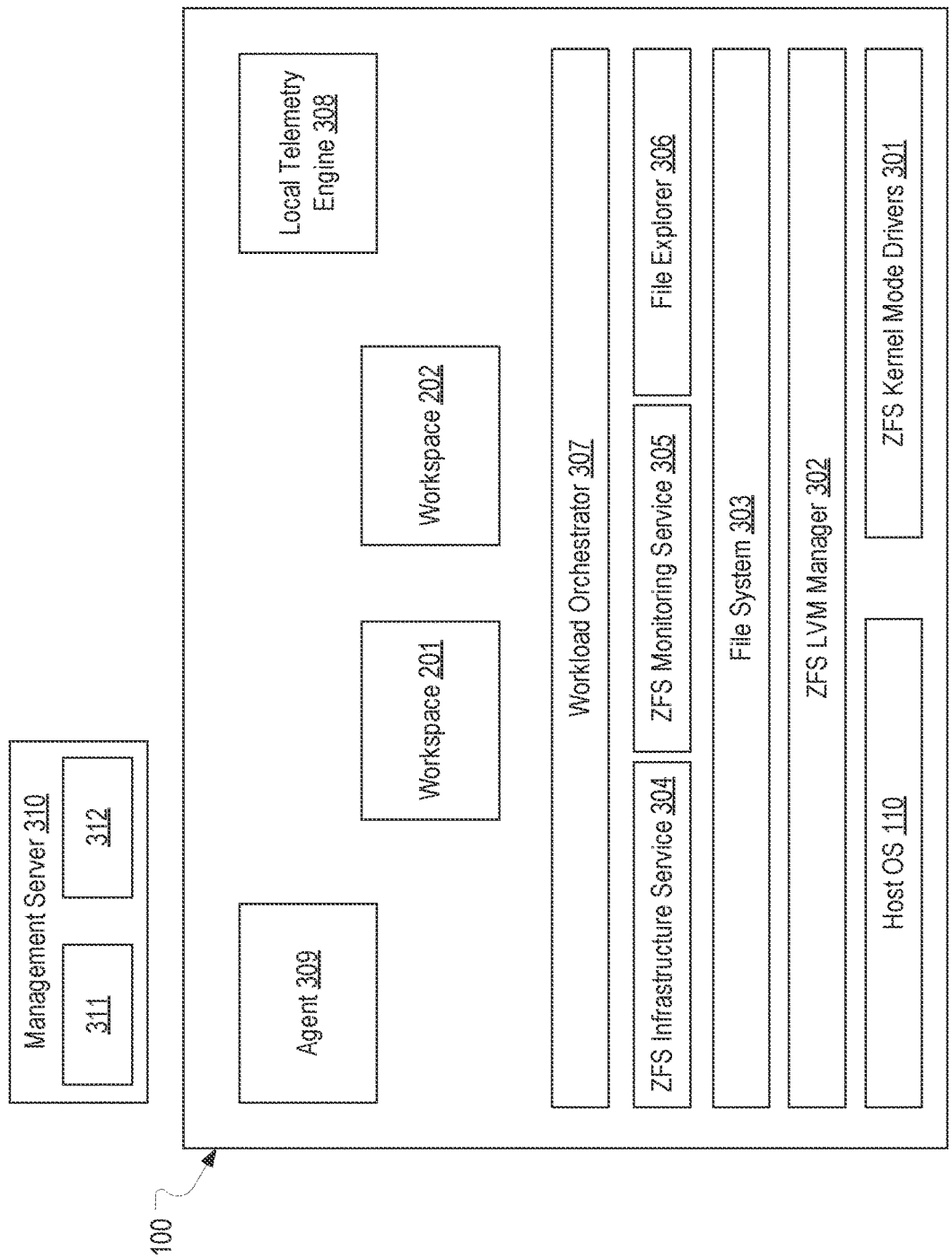
FIG. 3 provides an example of various components that may be used to implement embodiments of the present invention.

FIG. 3, which is based on FIGS. 1 and 2, provides an example of various components that may be employed on computing device 100 to implement one or more embodiments of the present invention and is intended to provide an overview. In this example, it is assumed that computing device 100 is configured to implement a ZFS file system and therefore includes ZFS kernel mode drivers 301, ZFS logical volumes (LVM) manager 302, file system 303, ZFS infrastructure service 304, ZFS monitoring service 305 and file explorer 306.

ZFS kernel mode drivers 301 and ZFS LVM manager 302 can represent the components of the ZFS architecture that create and manage logical volumes and perform other low-level functionality. A pluggable authentication module (not shown) could be employed to handle user authentication and can report user authentication and other user details to ZFS infrastructure service 304.

ZFS infrastructure service 304 can be configured to interface with ZFS kernel mode drivers 301 and/or ZFS LVM manager 302 to create a ZFS pool (or zpool) and ZFS datasets. In some embodiments, ZFS infrastructure service 304 may create ZFS datasets on an individual user basis. For example, when it is notified of a successful user login, ZFS infrastructure 304 may create the zpool and an encrypted ZFS dataset for the user. In some embodiments, ZFS infrastructure service 304 may use a random passphrase to encrypt the ZFS dataset.

ZFS monitoring service 305 can be configured to monitor various aspects of the user's interactions with the ZFS dataset. For example, ZFS monitoring service 305 may monitor the user's usage pattern such as downloads or other data the user may store in the ZFS dataset, ZFS dataset utilization, zpool utilization, physical device utilization, etc. ZFS monitoring service 305 may also be configured to dynamically expand and contract a ZFS dataset such as based on predictions provided by local telemetry engine 308 or pre-configured quotas specified by management server 310. Agent 309 may be used to communicate with management server 310. Workload orchestrator 307 can be configured to evaluate workspaces, such as workspaces 201 and 202, to provide information to ZFS infrastructure 304 and ZFS monitoring service 305.

Management server (or servers) 310 can be configured to deploy workspaces, such as workspaces 201 and 202, to client computing device 100 (e.g., using a workspace orchestrator 311). Management server 310 may also include a centralized telemetry engine 312 which can be configured to evaluate telemetry data from local telemetry engine 308. In some embodiments, the functionality that management server 310 performs could be localized on client computing device 100.

The components depicted in FIG. 3 are provided as examples only. In embodiments of the present invention, any number and/or arrangement of components could be used. Therefore, embodiments of the present invention should be construed primarily based on the functionality that is performed rather than based on any component that may be described as performing the functionality.

FIG. 4 provides an example of data structures that may be employed in one or more embodiments of the present invention including a workspace characterization table 401 and a dataset quota table 402. Workspace orchestrator 311 may create and maintain workspace characterization table 401 to define workspace weightages that should be applied to workspaces when they are deployed to client computing devices. Workspace characterization table 401 may identify a number of workspace types and, for each workspace type, a privilege level, whether the workspace type is trusted and a workspace weightage. For example, for a workspace type of "designer apps" (i.e., for a workspace that is used to host designer apps) which has either a user or admin privilege level and is trusted, the assigned workspace weightage may be "heavy." As another example, for a workspace type of "productivity apps" which has either a user or admin privilege level and is trusted, the assigned workspace weightage may be "medium." As a further example, for a workspace type of "text editing apps" which has either a user or admin privilege level and is trusted, the assigned workspace weightage may be "light." If any of these workspace types are not trusted, their assigned workspace weightage may be "non-trusted." Similarly, for a workspace type of "personal workspace" (i.e., a workspace that is for a user's personal use) which has a user privilege level and is trusted, the assigned workspace weightage may be light. Also, for a workspace type of "shared storage" (i.e., a workspace that employs shared storage) which is trusted, the assigned workspace weightage may be heavy or medium when the privilege level is admin or user respectively.

Accordingly, workspace characterization table 401 represents that various criteria can be used to assign a particular workspace weightage to each workspace that may be deployed on a client computing device. In the depicted example, there are four distinct workspace weightages: heavy, medium, light and non-trusted. However, in embodiments of the present invention, any suitable number of workspace weightages could be used. Also, other types and combinations of criteria could be used to assign a workspace weightage to a workspace. In some embodiments, an admin could create and update workspace characterization table 401. In some embodiments, machine learning techniques could be employed to create and update workspace characterization table 401.

Workspace orchestrator 311 may create and maintain dataset quota table 402 to define various quotas for each workspace weightage. For example, for a heavy workspace weightage, an initial quota may be 100%, an expansion quota may be 50% and a contraction quota may be 50%. As described in detail below, these quotas define how a dataset assigned to a workspace should be sized in various circumstances.

Figure 5A:
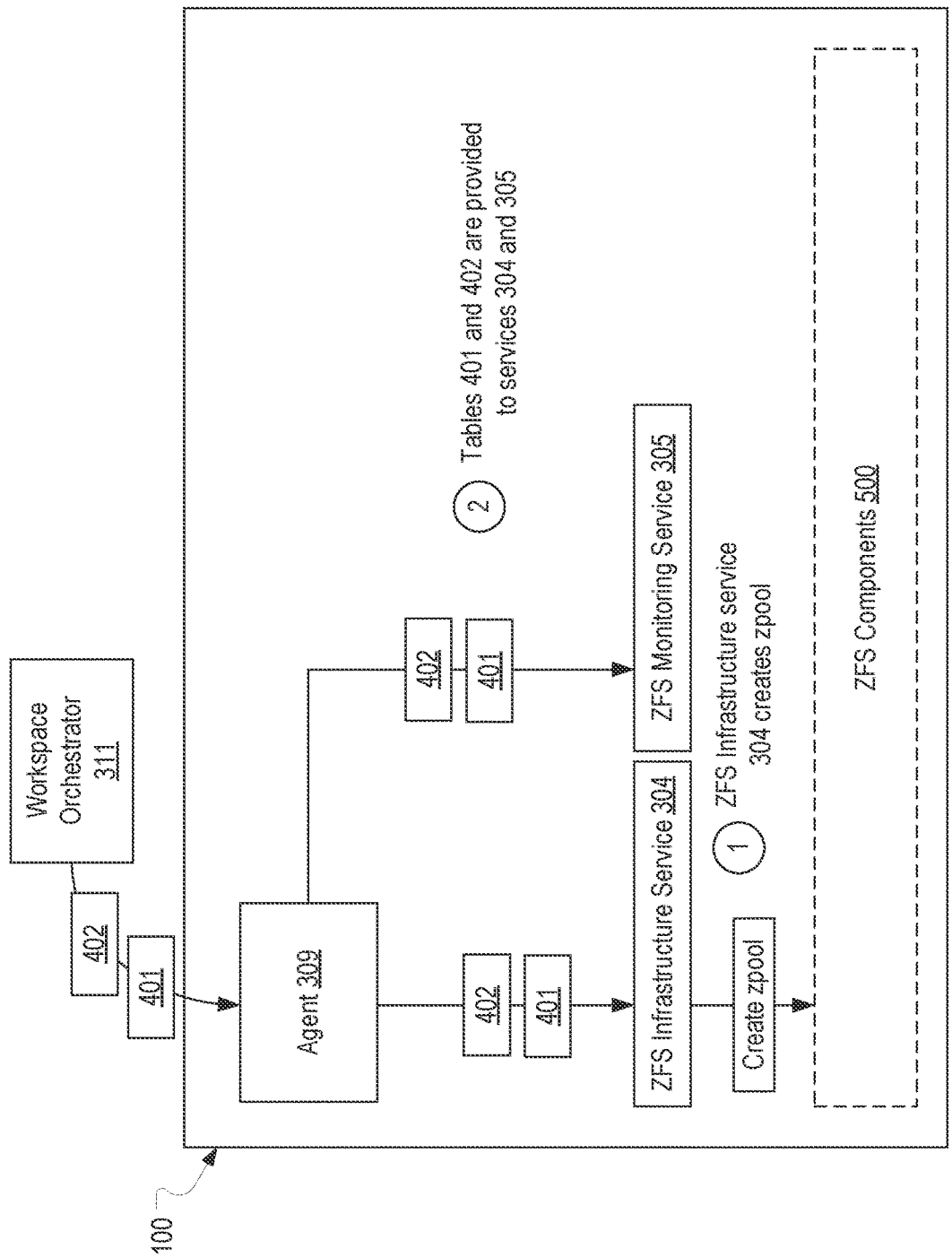
FIGS. 5A-5F provide an example of how datasets may be created and managed in a zpool in accordance with one or more embodiments of the present invention.

FIGS. 5A-5F provide an example of how storage, in the form of ZFS datasets, can be allocated to workspaces in accordance with one or more embodiments of the present invention. To simplify this example, the components that are necessary for implementing ZFS are generalized as ZFS components 500. FIG. 5A represents preliminary functionality that can be performed in preparation for workspaces being deployed on computing device 100. As shown, in step 1, ZFS infrastructure service 304 can interface with ZFS components 500 to create a zpool (i.e. a virtual storage pool in the ZFS environment) that can be used to create datasets for individual workspaces that may be deployed on client computing device 100. In some embodiments, ZFS infrastructure service 304 may create the zpool with an initial size that is a percentage of the total free space available on any storage devices. For example, if the one or more storage devices accessible to client computing device 100 have a total free space of 240 GB, ZFS infrastructure may reserve a portion of this free space (e.g., 10 GB) as system handling space and may categorize the remaining free space (e.g., 230 GB) as ZFS free space (i.e., space that could be used for one or more zpools).

In some embodiments, and in conjunction with creating the zpool, ZFS infrastructure service 304 may also calculate/determine expansion information for the zpool and maximum and minimum quotas for any datasets created in the zpool. For example, ZFS infrastructure service 304 may calculate/determine a minimum zpool expansion size (e.g., 1 GB) and may calculate/determine a zpool expansion size as a percentage (e.g., 10%) of the ZFS free space (e.g., 23 GB when the ZFS free space is 230 GB). Also, ZFS infrastructure service 304 may determine a maximum quota (e.g., 10 GB) for datasets and a minimum quota (e.g., 64 MB) for datasets. Such information and quotas can be configurable and/or dynamically determined.

In step 2, which could be performed at any suitable time, workspace characterization table 401 and dataset quota table 402 can be delivered to ZFS infrastructure service 304 and ZFS monitoring service 305. As described in detail below, ZFS infrastructure service 304 and ZFS monitoring service 305 may use these tables as part of creating, expanding and contracting datasets within the zpool.

Figure 5B:
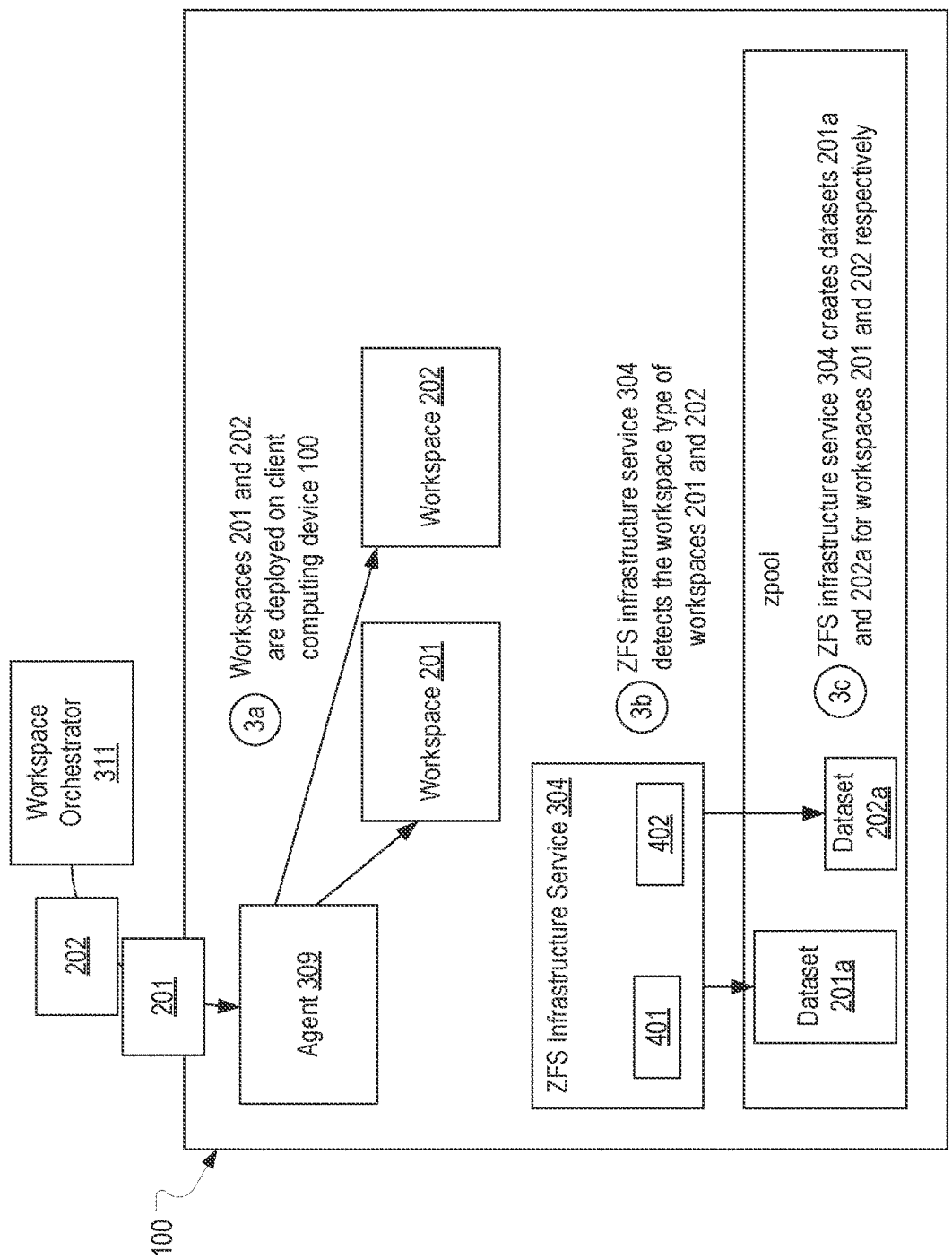

Turning to FIG. 5B, in step 3a, workspaces 201 and 202 are deployed on client computing device 100. As shown, in some embodiments, workspaces 201 and 202 could be deployed from workspace orchestrator 311. In other embodiments, one or both of workspaces 201 and 202 could be maintained on and deployed from client computing device 100. In some embodiments, one or both of workspaces 201 and 202 could be deployed in response to a user logging. In other embodiment, one or both of workspaces 201 and 202 could be deployed in response to a user request. Accordingly, the particular manner in which a workspace is deployed in not essential to the present invention.

In step 3b, ZFS infrastructure service 304 can detect the workspace type for workspaces 201 and 202. For example, ZFS infrastructure service 304 could interface with workload orchestrator 307 to receive information about workspaces 201 and 202. Although not shown, ZFS infrastructure service 304 may also know or may determine the privilege level of the logged in user (e.g., user or admin). Accordingly, step 3b can represent any functionality that ZFS infrastructure 304 may perform to determine the criteria needed to determine a workspace weightage using workspace characterization table 401.

In step 3c, ZFS infrastructure service 304 can create datasets 201a and 202a in the zpool for workspaces 201 and 202 respectively. ZFS infrastructure service 304 may create datasets 201a and 202a with a size that is based on a workspace weightage for each workspace 201 and 202. For example, it is assumed that workspace 201 is used to host designer apps that are trusted. Therefore, workspace characterization table 401 dictates that the workspace weightage for workspace 201 is heavy. It is also assumed that workspace 202 is used to host productivity apps that are trusted. Therefore, workspace characterization table 401 dictates that the workspace weightage for workspace 202 is medium.

ZFS infrastructure service 304 may then use dataset quota table 402 to determine the initial quota to be used to calculate the initial size of each dataset. For example, because the workspace weightage for workspace 201 is heavy, dataset quota table 402 dictates that the initial quota for workspace 201 should be 100% of the maximum quota (e.g., 10 GB (or 100% of 10 GB maximum quota)). Similarly, because the workspace weightage for workspace 202 is medium, dataset quota table 402 dictates that the initial quota for workspace 202 should be 50% of the maximum quota (e.g., 5 GB (or 50% of the 10 GB maximum quota)). Accordingly, FIG. 5B represents that the size of dataset 201*a* is larger than the size of dataset 202*a*. In some embodiments, ZFS infrastructure service 304 may also consider the amount of free space in the zpool (or zpools) that is available in calculating the initial quota for a workspace. For example, if 5% of the zpool free space is less than the initial quota dictated by dataset quota table 402, ZFS infrastructure service 304 may set the initial quota for a workspace to 5% of the zpool free space. In such a case, if the zpool free space fell below 200 GB, ZFS infrastructure service 304 may calculate the initial quota as 5% of the ZFS free space (e.g., 5% of 200 GB is 10 GB).

At this point, datasets 201*a* and 202*a* will be available for workspaces 201 and 202 respectively and have been sized based on the workspace weightage assigned to their respective workspace types. As a result, workspace 201, which is likely to consume more storage than workspace 202, will have access to a larger dataset within the zpool. Likewise, workspace 202 will be allocated a smaller dataset so that the zpool is not unnecessarily consumed. In this way, embodiments of the present invention can ensure that the amount of the zpool that is initially allocated to a particular workspace can be intelligently selected so that the zpool is utilized efficiently and fairly.

In embodiments of the present invention, the size of datasets can also be dynamically expanded or contracted based on the workspace weightage assigned to the respective workspaces and the amount of zpool free space. For example, when the amount of free space available in a dataset falls below a threshold, it may trigger a dataset expansion process for that dataset. Also, when the amount of zpool free space falls below a threshold (e.g., when most of the zpool has been allocated to/reserved for the datasets), it may trigger a dataset contraction process for some or all datasets in the zpool.

Figure 5C:
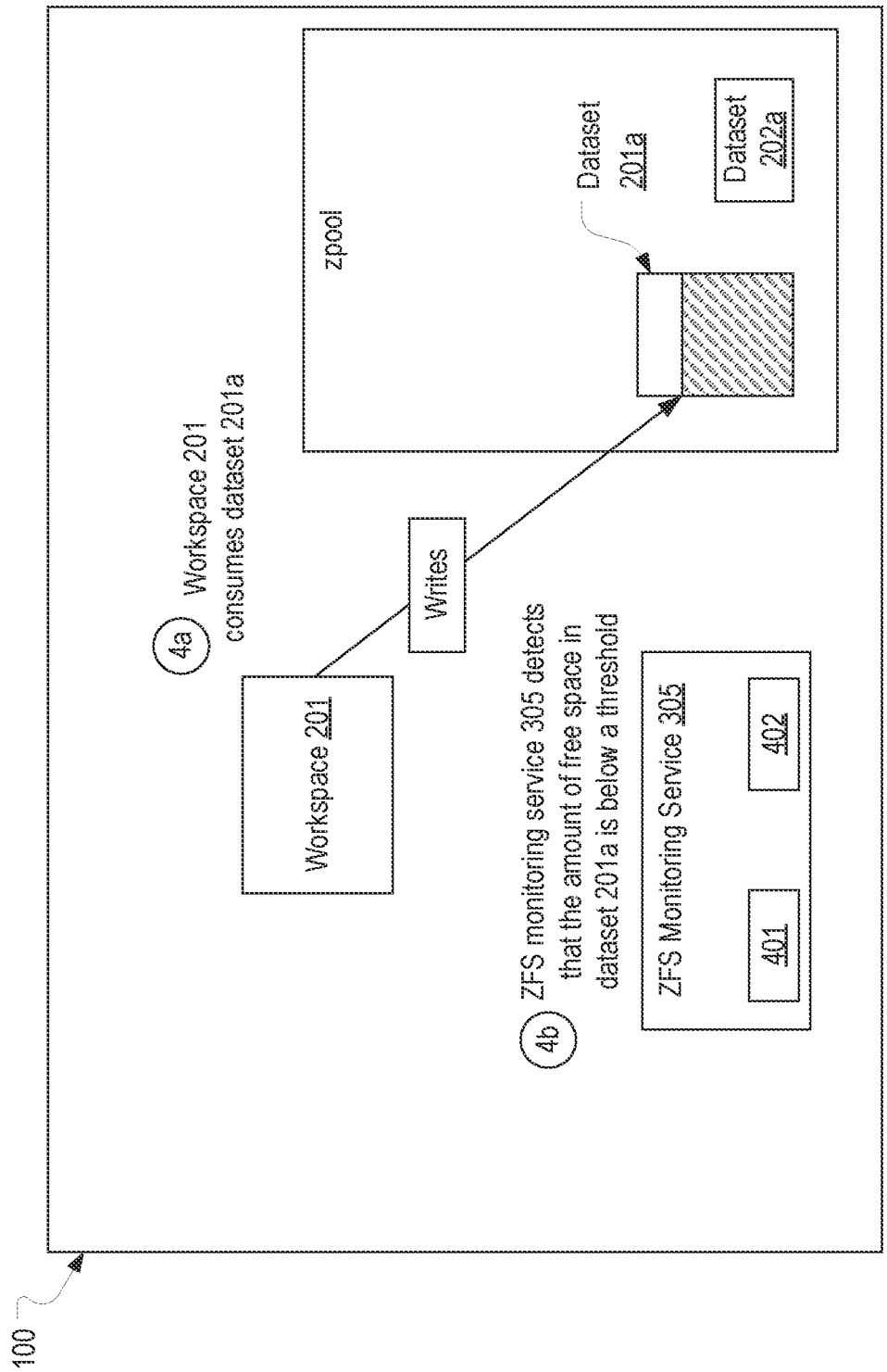
Figure 5D:
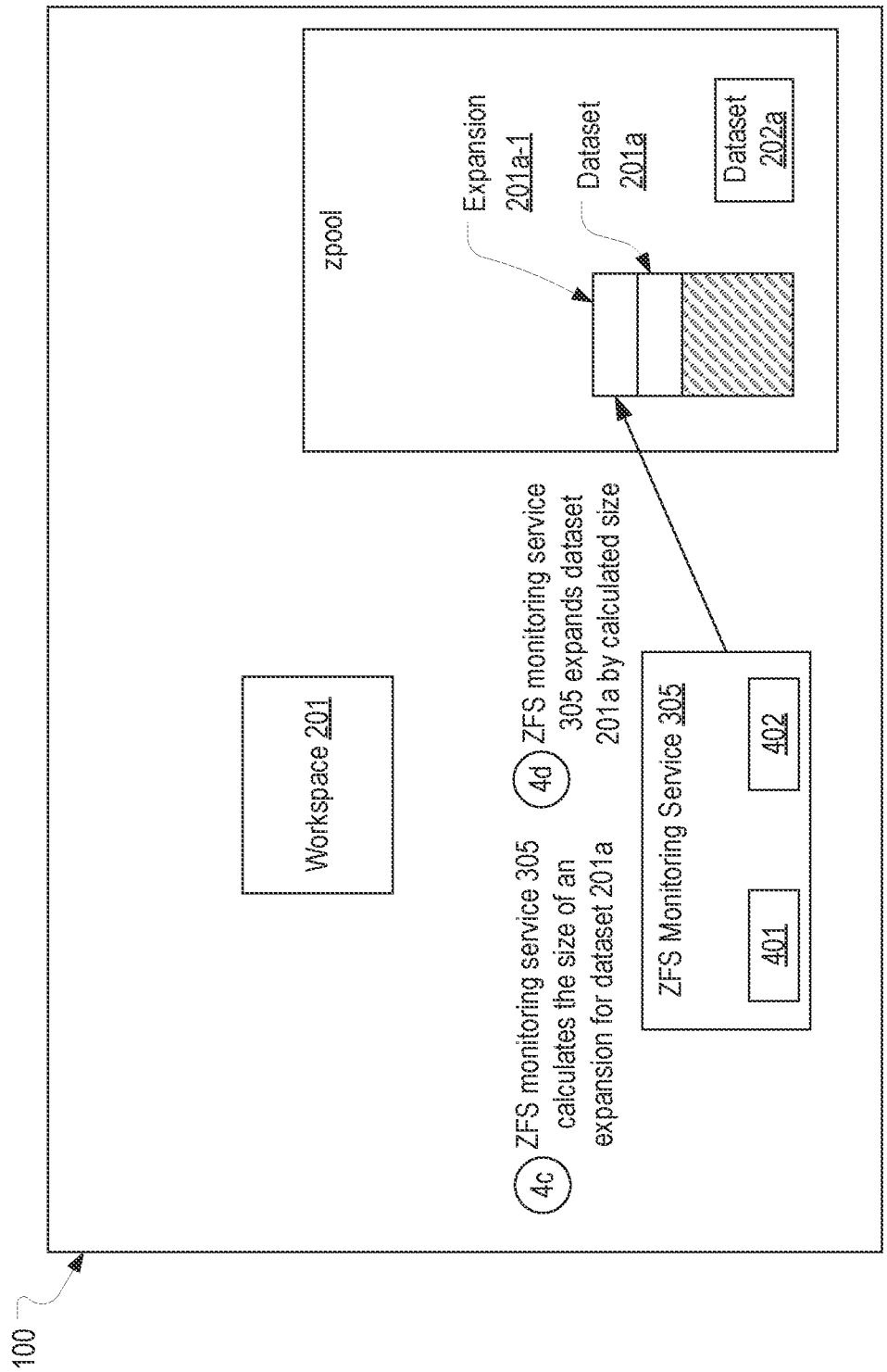

FIGS. 5C and 5D provide an example of how ZFS monitoring service 305 can expand dataset 201*a* when it detects that the free space available in dataset 201*a* has fallen below a threshold. Turning to FIG. 5C, in step 4*a*, it is assumed that workspace 201 (or more particularly, the application(s) hosted in workspace 201) has consumed dataset 201*a* (e.g., by writing data/files to dataset 201*a*). In step 4*b*, ZFS monitoring service 305, through its monitoring of the datasets in the zpool, can detect that the amount of free space available in dataset 201*a* has fallen below a threshold or that some other expansion trigger has occurred. As one example only, ZFS monitoring service 305 can monitor consumption of datasets to determine when the amount of free space has fallen below 50% of the data set's initial quota. ZFS monitoring service 305 can use any suitable technique to monitor the datasets including interfacing with workload orchestrator 307 and ZFS components 500.

Turning to FIG. 5D, in step 4*c*, ZFS monitoring service 305 can calculate the size of an expansion for dataset 201*a*. In some embodiments, ZFS monitoring service 305 may use workspace characterization table 401 and dataset quota table 402 to calculate this size. For example, ZFS monitoring service 305 may calculate the size of the expansion using the expansion quota for the workspace weightage of workspace 201. Continuing the example from above, since workspace 201 has a workspace weightage of heavy, ZFS monitoring service 305 can determine that the size of the expansion should be 50% of the initial quota for dataset 201*a* which would be 5 GB. In this way, ZFS monitoring service 305 can calculate the size of the expansion in a way that accounts for workspace 201's expected/predicted usage of storage.

In some embodiments, ZFS monitoring service 305 may also consider the current amount of zpool free space when calculating the sizes of an expansion for a dataset. For example, ZFS monitoring service 305 may use the expansion quota as described above when the amount of zpool free space remains above 25% of the total size of the zpool (i.e., while zpool consumption remains below 75%) but may use a fraction of the expansion quota when the amount of zpool free space falls below 25%. For example, as part of step 4*c*, if ZFS monitoring service 305 determined that more than 75% of the zpool has been consumed, it may calculate the size of the expansion for dataset 201*a* as 0.5*50% of the initial quota or 2.5 GB. In some embodiments, if the amount of zpool free space falls below a critical threshold, such as 10%, ZFS monitoring service 305 may not allow any dataset to be expanded.

In step 5D, ZFS monitoring service 305 can expand dataset 201*a* by the size calculated based on the expansion quota. Accordingly, FIG. 5D shows that an expansion 201*a*-1 has been added to dataset 201*a* therefore increasing the amount of storage that is available to workspace 201. ZFS monitoring service 305 can use any suitable technique to create expansion 201*a*-1 such as by interfacing with ZFS components 500. ZFS monitoring service 305 may use this expansion process for any dataset that may exist in the zpool. For example, if ZFS monitoring service 305 detected that workspace 202 had consumed dataset 202*a* in excess of a defined threshold, it could use the 25% expansion quota defined in dataset quota table 402 for workspaces with a medium workspace weightage and possibly the amount of zpool free space to calculate the size of an expansion to add to dataset 202*a*. Also, this expansion process can be repeated for the same dataset. For example, after expansion 201*a*-1 is added to dataset 201*a*, if workspace 201's consumption of dataset 201*a* again exceeds the threshold, ZFS monitoring service 305 may again calculate the size of an expansion using the expansion quota and add it to dataset 201*a*. Notably, because ZFS monitoring service 305 may account for the amount of zpool free space in calculating the size of an expansion, different-sized expansions could be added to a dataset.

Figure 5E:
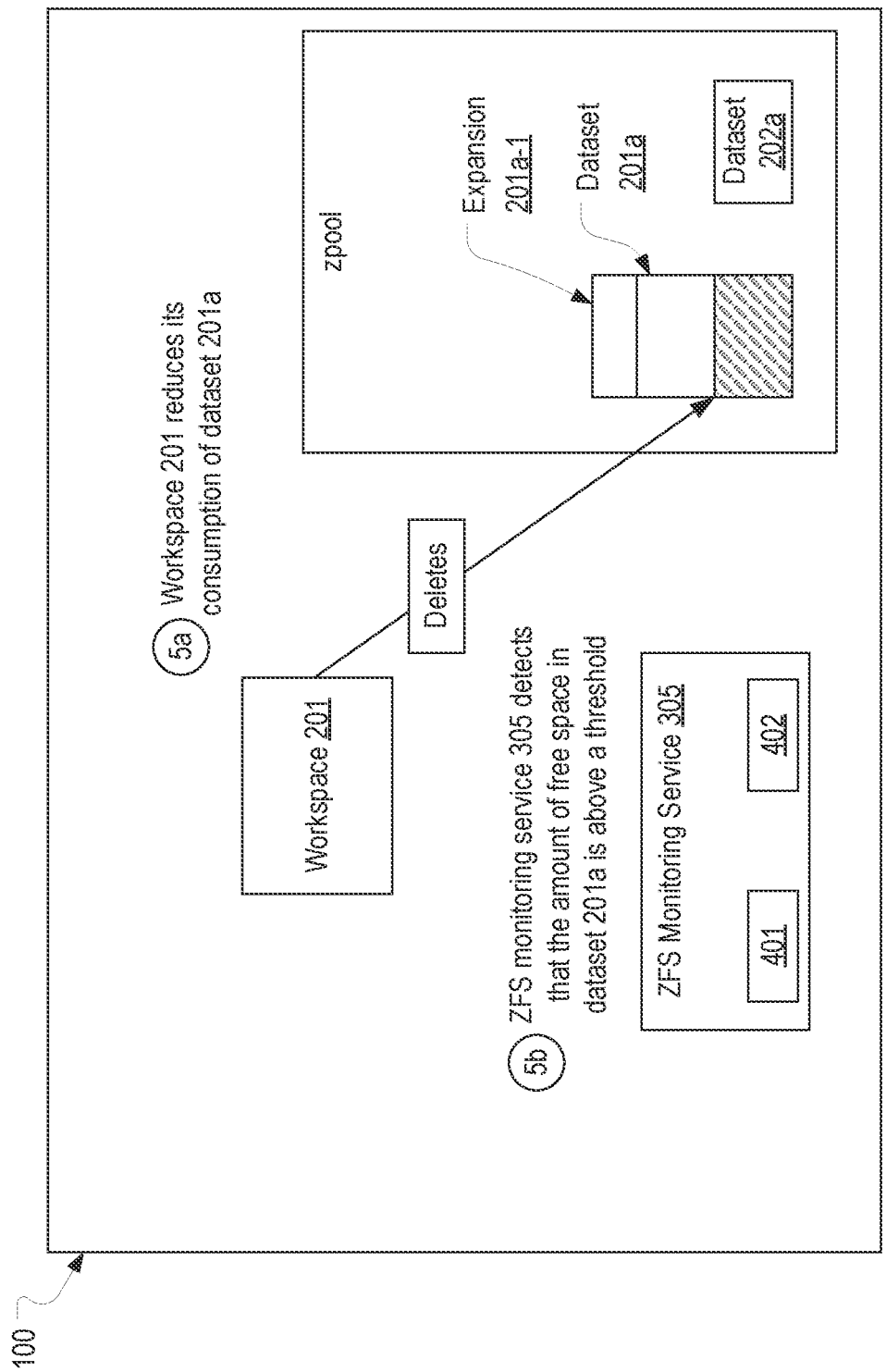
Figure 5F:
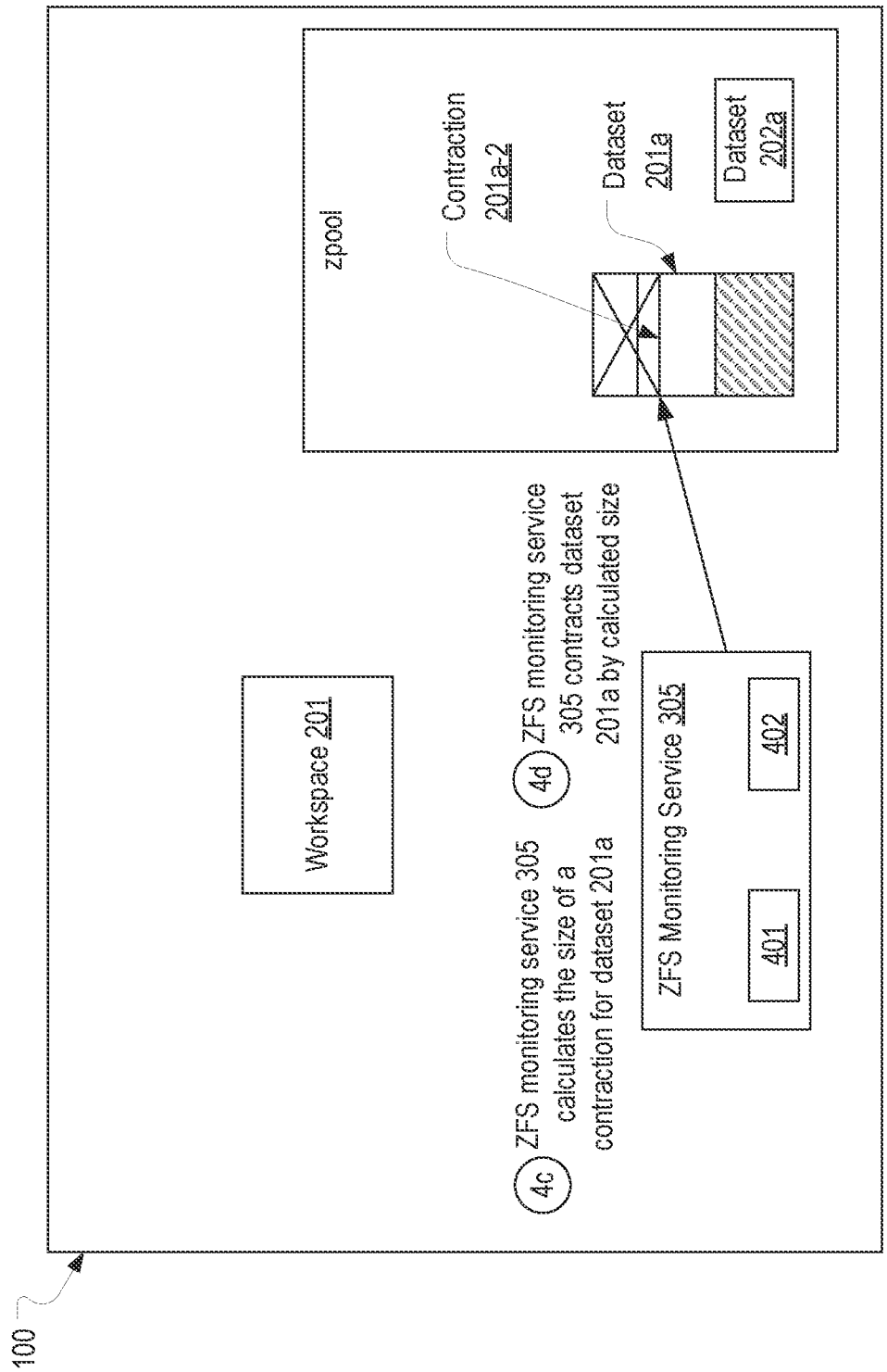

ZFS monitoring service 305 may perform a contraction process that is similar to the expansion process. FIGS. 5E and 5F provide an example. Turning to FIG. 5E, in step 5*a*, it is assumed that workspace 201 reduces its consumption of dataset 201*a*. For example, one or more applications hosted in workspace 201 or the user may delete files that had been stored in dataset 201*a*. In step 5*b*, ZFS monitoring service 305 may detect that the amount of free space in dataset 201*a* is above a threshold. For example, ZFS monitoring service 305 could detect when the amount of free space in dataset 201*a* is greater than two times the corresponding contraction quota defined in dataset quota table 402. Continuing the example from above, because workspace 201*a* has a workspace weightage of heavy for which a contraction quota of 50% of the initial quota is defined, ZFS monitoring service 305 could determine that dataset 201a should be contracted if the amount of free space exceeds 10 GB.

In some embodiments, ZFS monitoring service 305 could implement the contraction process at any time. In other embodiments, ZFS monitoring service 305 may implement the contraction process whenever the amount of zpool free space falls below a threshold (e.g., when the amount of zpool free space may be insufficient to allow other datasets to expand). Accordingly, ZFS monitoring service 305 could perform step 5b at any time or in response to a contraction trigger.

Turning to FIG. 5F, in step 4c, ZFS monitoring service 305 can calculate the size of a contraction for dataset 201. In a similar manner as described above for calculating the size of an expansion, ZFS monitoring service 305 could calculate the size of the contraction using the contraction quota defined in dataset quota table 402 for the workspace weightage assigned to the corresponding workspace. Accordingly, in this example where workspace 201 is assumed to have a heavy workspace weightage, ZFS monitoring service 305 could calculate the size of the contraction using the contraction quota of 50% of the initial quota which would be 5 GB (50% of the 50 GB initial quota). Also, in some embodiments, ZFS monitoring service 305 may consider the amount of zpool free space when calculating the size of the contraction. For example, if the amount of zpool free space has fallen below a critical threshold (e.g., 10%), ZFS monitoring service 305 may calculate the size of the contraction as a multiple of the contraction quota (e.g. 1.5 times the contraction quota or 7.5 GB).

In FIG. 5F, ZFS monitoring service 305 can contract dataset 201a in accordance with the calculated size for the contraction. It is assumed that ZFS monitoring service 305 has determined to contract dataset 201a when the amount of zpool free space has dropped below a critical threshold and that, as a result, ZFS monitoring service 305 calculated the size of the contraction as a multiple of the contraction quota (7.5 GB). Therefore, FIG. 5F shows a contraction 201a-2 of 7.5 GB that is applied to dataset 201a. ZFS monitoring service 305 could perform a similar contraction process to any other dataset in the zpool. For example, if ZFS monitoring service 305 determined that dataset 202a should be contracted, and based on the assumption that workspace 202 has a workspace weightage of medium, the calculated contraction could be the defined 25% contraction quota of the initial quota (2.5 GB) or some multiple of the contraction quota (e.g., 3.75 GB).

As can be seen, when embodiments of the present invention are implemented, the initial quota, expansion quota and contraction quota applied to a workspace can be dictated by the workspace weightage assigned to the workspace. In this way, the allocation of the zpool to the various datasets can be performed efficiently, fairly and in accordance with known or predicted storage usage.

In some embodiments, machine learning techniques can be employed to intelligently identify workspace weightages and/or to intelligently define initial quotas, expansion quotas and contraction quotas. For example, in some embodiments, a workspace can be monitored to learn over time whether it should be assigned the heavy, medium or light workspace weightage. Such monitoring could include detecting environment type (e.g., enterprise, hot seat, etc.), user or application disk utilization, a number of dataset expansions and contractions during a time period, resource utilization (e.g., battery, CPU, memory, I/O, etc.), usage patterns (e.g., downloads, reads and writes, clean-up frequency, etc.), time-of-day usage (e.g., working hours vs. non-working hours), day-of-week usage (e.g., workdays vs. weekends), etc. Notably, such parameters could be monitored on multiple client computing devices to train machine learning models which could in turn be used to predict the best quotas for workspaces deployed on other client computing devices. Local telemetry engine 308 and centralized telemetry engine 312 could be used for this purpose.

Using the techniques of the present invention, dataset allocation, expansion and contraction can be optimized for a number of use cases. For example, in an environment where different workspaces (or containers) are used to deploy different applications on a client computing device, each workspace can be allocated a dataset having a size that is best suited for the application(s) hosted therein. As another example, in an environment where multiple users may share the zpool, each user may be provided with a different personal workspace and each workspace can be allocated a dataset having a size that is best suited for the particular user, or more particularly, that is best suited for how the particular user utilizes storage.

In embodiments where the zpool is used to provide datasets to multiple users, each dataset (or folders defined therein) for a user workspace may be encrypted with a passphrase key that is specific to the respective user. In such cases, when a user is logged in to a client computing device that has access to the zpool, the passphrase key for the particular user can be used to allow the user to access only his or her dataset(s). Such embodiments may be most beneficial when the zpool is implemented using an external drive that may be connected to multiple client computing devices to when multiple users may log into the same client computing device.

In summary, embodiments of the present invention enable the size of a dataset to be initially set and subsequently adjusted in accordance with a workspace weightage assigned to workspace to which the dataset pertains. Such workspace weightages and their associated quotas can be predefined, dynamically calculated, machine learned or determined in any other suitable way. By implemented embodiments of the present invention the allocation and consumption of a zpool can be done fairly and efficiently.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented on a client computing device, for allocating storage to workspaces in a ZFS-based environment, the method comprising:
   determining that a workspace is deployed on a client computing device on which a zpool is created;
   in response to determining that the workspace is deployed on the client computing device, determining a workspace weightage assigned to the workspace;
   based on the workspace weightage, selecting an initial quota for a dataset for the workspace; and
   creating the dataset in the zpool with a size matching the initial quota.

2. The method of claim 1, wherein the workspace weightage is one of multiple workspace weightages.

3. The method of claim 1, wherein determining the workspace weightage assigned to the workspace comprises accessing a workspace characterization table.

4. The method of claim 1, wherein determining the workspace weightage assigned to the workspace comprises determining a privilege level of a user of the client computing device.

5. The method of claim 1, wherein determining the workspace weightage assigned to the workspace comprises determining whether one or more applications hosted in the workspace are trusted.

6. The method of claim 1, wherein the initial quota is a percentage of a maximum initial size for datasets.

7. The method of claim 1, further comprising:
   detecting that free space in the dataset has fallen below a threshold;
   based on the workspace weightage, selecting an expansion quota for the dataset; and
   expanding the dataset with an expansion size matching the expansion quota.

8. The method of claim 7, wherein the expansion quota is a percentage of a maximum initial size for datasets.

9. The method of claim 1, further comprising:
   detecting that free space in the dataset is above a threshold;
   based on the workspace weightage, selecting a contraction quota for the dataset; and
   contracting the dataset with a contraction size matching the contraction quota.

10. The method of claim 9, wherein the contraction quota is a percentage of a maximum initial size for datasets.

11. The method of claim 9, further comprising:
    detecting that free space in the zpool has fallen below a critical threshold.

12. The method of claim 1, further comprising:
    determining a second workspace weightage assigned to a second workspace on the client computing device that is different from the workspace weightage assigned to the workspace;
    based on the second workspace weightage, selecting a second initial quota for a second dataset for the second workspace, the second initial quota being different from the initial quota; and
    creating the second dataset in the zpool with a size matching the second initial quota.

13. The method of claim 1, wherein the workspace is one of a container in which one or more applications are hosted or an encrypted folder containing user data and one or more applications.

14. The method of claim 1, wherein the workspace is a container for a user.

15. The method of claim 1, further comprising:
    using machine learning techniques to determine a change to the workspace weightage assigned to the workspace or an adjustment to the initial quota.

16. One or more computer storage media storing computer executable instructions which when executed implement a method for allocating storage to workspaces in a ZFS-based environment, the method comprising:
    determining that a first workspace deployed on a client computing device has a first workspace weightage, the client computing device including a zpool;
    creating a first dataset in the zpool with a first size matching a first initial quota defined for the first workspace weightage;
    determining that a second workspace on the client computing device has a second workspace weightage; and
    creating a second dataset in the zpool with a second size matching a second initial quota defined for the second workspace weightage.

17. The computer storage media of claim 16, wherein the method further comprises:
    contracting the first dataset by a first contraction size matching a first contraction quota defined for the first workspace weightage; and
    contracting the second dataset by a second contraction size matching a second contraction quota defined for the second workspace weightage.

18. The computer storage media of claim 16, wherein the method further comprises:
    expanding the first dataset by a first expansion size matching a first expansion quota defined for the first workspace weightage; and expanding the second dataset by a second expansion size matching a second expansion quota defined for the second workspace weightage.

19. A client computing device comprising:

one or more processors; and computer storage media storing computer executable instructions which when executed by the one or more processors implement a method for allocating storage to workspaces in a ZFS-based environment, the method comprising:

determining that a workspace deployed on the client computing device has a workspace weightage, the client computing device including a zpool;

creating a dataset in the zpool with a size matching an initial quota defined for the workspace weightage;

in response to determining that consumption of the dataset has exceeded a first threshold, expanding the dataset with an expansion size matching an expansion quota defined for the workspace weightage; and in response to determining that consumption of the dataset has fallen below a second threshold, contracting the dataset by a contraction size matching a contraction quota defined for the workspace weightage.

20. The client computing device of claim 19, wherein the workspace weightage is defined in a workspace characterization table.

\* \* \* \* \*